Feb. 9, 1926. 1,572,781
P. L. FARMER
HOSE COUPLING
Filed Oct. 29, 1923 2 Sheets-Sheet 1
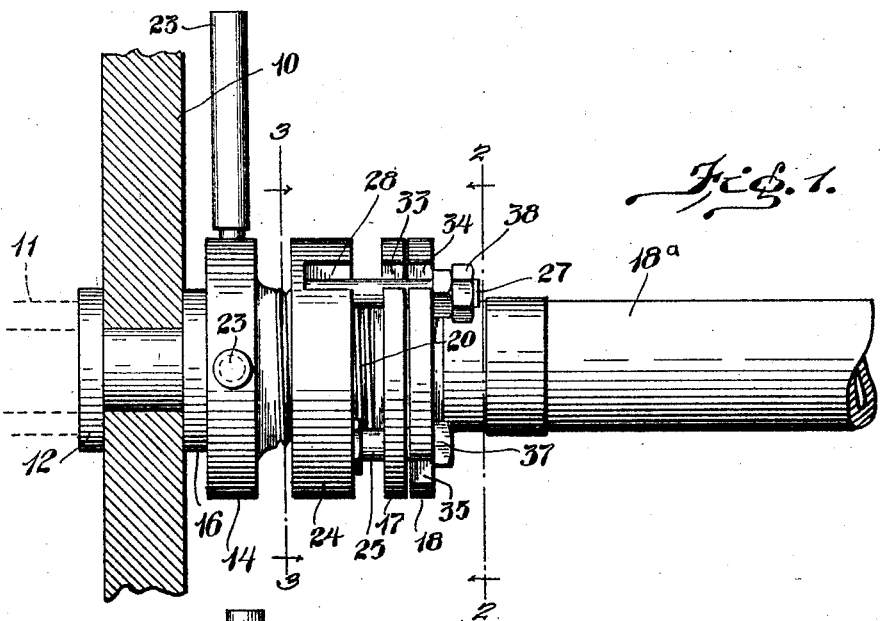
Fig. 1.
Fig. 3.
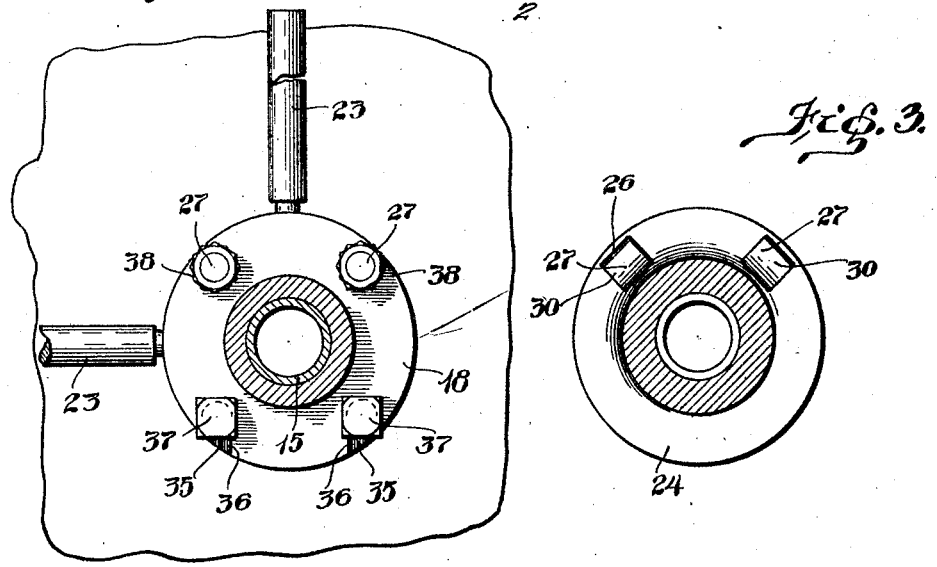
Fig. 2.
Inventor
Percy L. Farmer
By Edwin S. Clarkson
his Attorney Feb. 9, 1926. 1,572,781
P. L. FARMER
HOSE COUPLING
Filed Oct. 29, 1923 2 Sheets-Sheet 2

Inventor
Percy L. Farmer
By Edwin S. Clarkson
his Attorney

Patented Feb. 9, 1926.

1,572,781

UNITED STATES PATENT OFFICE.

PERCY L. FARMER, OF RICHMOND, MAINE.

HOSE COUPLING.

Application filed October 29, 1923. Serial No. 671,471.

*To all whom it may concern:*

Be it known that I, PERCY L. FARMER, a citizen of the United States, residing at Richmond, in the county of Sagadahoc and State of Maine, have invented certain new and useful Improvements in Hose Couplings, of which the following is a description.

The invention relates to a pipe or hose coupling especially adapted for use in connection with oil tankers.

The principal object of the invention is to provide a ready means for quickly attaching the hose leading from an oil tank to a coupling member on the side of a vessel.

A further object is to provide a convenient and fluid tight coupling which may be used in any desired connection.

An illustrative embodiment of the invention is shown in the accompanying drawings in which—

Figure 1 is a side view of the improved hose coupling shown as applied to a vessel, a small portion of the side of which is shown in section.

Fig. 2 is a transverse section on line 2—2 of Fig. 1 looking in the direction of the arrows, Fig. 3 is a similar view on line 3—3 of Fig. 1.

Figure 4:
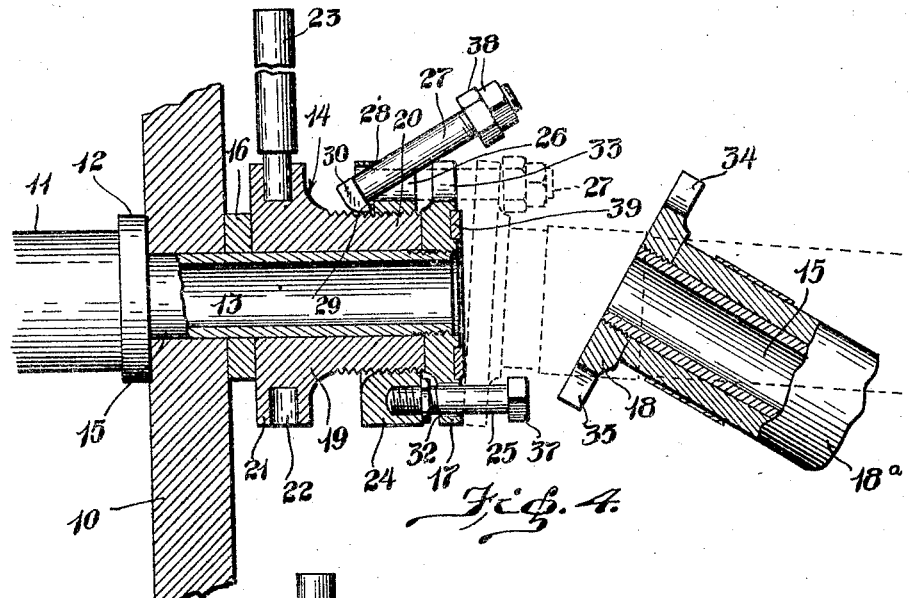
Fig. 4 is a central longitudinal section of the coupling, the removable portion thereof being shown in the dotted position as attached to the fixed portion of the coupler, and in the full line position being shown as separated therefrom.
Figures 5, 6:
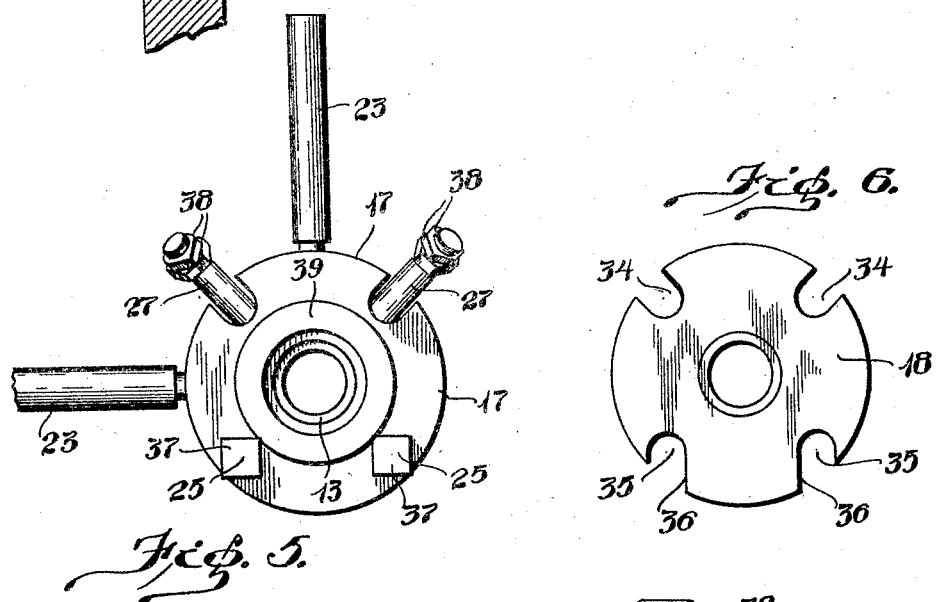
Fig. 5 is an end view of that portion of the coupler which is secured to the side of the vessel.
Fig. 6 is a similar view of the removable portion of the coupler.

While it is to be understood that the coupler is of general application, it is of special value when used for connecting the hose leading from an oil supply tank to the conduit communicating with the interior of an oil tanker, in which relation it is particularly important that the parts of the coupling may be rapidly connected and that the coupling when made be completely fluid tight. It is also important that operations of connecting the parts and screwing them into locking position be such as may be performed readily and quickly by one man instead of requiring the combined efforts of several men as is now the case.

A portion of the side of a vessel, of the oil tanker type, is designated by the reference numeral 10. A pipe 11 is shown as leading to the oil tank of the vessel, this conduit being provided with a collar 12, which abuts against the inner side of the vessel wall 10. A pipe 13 of somewhat smaller diameter than the first is preferably screwed into the collar 12 and extends through an aperture in the side of the vessel, the pipe projecting a substantial distance beyond the vessel wall.

One portion 14 of the hose coupling is adapted to be secured to the projecting end of the pipe 13, while the other portion 15 is secured to the hose 18ª, which leads from a suitable source of oil supply, not shown. As the coupling is exposed to the sea water the members 14 and 15 and the pipe 13 are preferably made of material which is not readily corroded.

As shown a gasket 16 is interposed between the coupling member 14 and the side 10 of the vessel to insure a tight joint.

At the end of the pipe 13 is fixedly secured a ring 17, against the outer face of which the face of a similar ring 18 formed on the coupling member 15 abuts when the parts are coupled together as shown in Fig. 1 and in dotted lines in Fig. 4.

A sleeve 19 is loosely mounted upon the pipe 13 in rear of the fixed or abutting ring 17, the forward portion of the sleeve being screw threaded as at 20 and the rear portion 21 being preferably enlarged and provided with a plurality of apertures 22 to receive a wrench 23.

Figure 7:
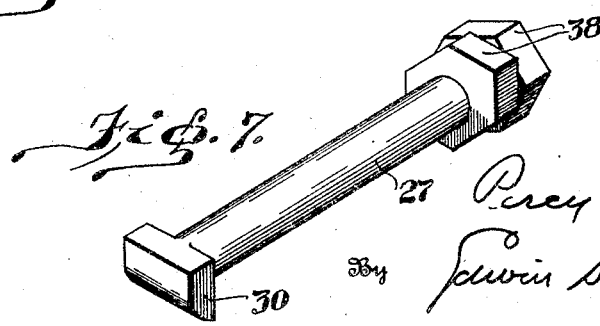
Fig. 7 is a perspective view of one of the bolts by means of which the two parts are secured together.

Rotatably mounted upon the threaded portion 20 of the sleeve 19 is a ring 24, from the lower portion of which extend one or more fixed bolts 25, two being shown, at the upper portion of the ring are formed a plurality of apertures, 26, preferably two in number, through which extend locking bolts 27. The apertures 26 are substantially larger than the diameter of the bolts, so that the fit is very loose, and furthermore slots 28 and 29 are cut in the ring 24, the slots 28 being in front of and above their respective apertures, and the slots 29 being in rear of the apertures and being of such size as to allow the heads 30 of the bolts to fit loosely therein. This construction enables the bolts to be raised to the position shown in full lines in Fig. 4, this operation being facilitated by curving one edge of head 30 of each bolt 27 as shown in Fig. 7.

The abutting ring 17 is provided with apertures 32 through which the fixed bolts 25 are adapted to pass while a pair of slots 33 are formed in its upper portion to accommodate the locking bolts 27.

The abutting ring 18 which is adapted to be connected to one end of the hose thimble 15 is provided with radial slots 34 in its periphery adapted to receive the lock bolts 27 as shown in the several views of the drawings. This ring 18 is provided in its lower edge with a pair of slots 35, the inner walls 36 of which are parallel and in the vertical. The walls of both slots 35 are parallel, one with the other, as more clearly seen in Figure 1 whereby the ring 18 with its attached hose 18ª can be readily hooked over and supported on the fixed bolts 25 by simply positioning the slots 35 above the bolts 25 and permitting the weight of the hose and the ring 18 to cause the ring 18 to slip down upon the fixed bolts 25 by gravity with the bolts 25 seated in the slots 35 in which position it is a very easy manipulation to drop the bolts 27 in the slots 34 and complete the coupling by tightening up the nuts of the bolts 27.

The operation of the device is simple. When a coupling is to be made the sleeve 19 is rotated so as to screw the ring 24 forward as far as possible or until it abuts against the rear of the fixed ring 17, at which position the fixed bolts 25 extend the maximum distance beyond the face of the ring 17.

The coupler member 15 on the end of the hose is then readily attached to the member 14, the slots 35 at the lower portion of the ring 18 fitting the fixed bolts 25 while the locking bolts 27 are dropped in place in the slots 34 at the upper portion of the ring 18. The ring 18 is held in place by the heads 37 of the fixed bolts 25 and nuts 38 on the ends of the bolts 27.

Before tightening the coupling the nuts 38 should be adjusted to bring the abutting faces of the rings 17 and 18 flush with each other. The sleeve 19 is then rotated in the proper direction to draw the locking ring 24 rearwardly, thereby drawing the ring 18 on the hose member 15 of the coupling tightly against the other member 14. A fluid tight joint is further insured by the use of a suitable gasket 39, preferably of leather or of rubber, though other materials may be used if desired.

While the preferred embodiment of the invention has been described with great particularity for the purpose of illustration, it is understood that many of the details may be varied without departing from the invention which is to be limited only by the annexed claims. It is to be further understood that while the coupling is particularly designed for use in connection with an oil tanker, it is of general application and may be used in many other relations.

What I claim is:

1. A hose coupler for oil tankers and the like comprising a pair of coupling members, one adapted to be secured to the side of a vessel end, the other to a hose communicating with an oil tank, said members having enlarged flanges, the front faces of which are adapted to be secured in abutting relation, a sleeve rotatably mounted upon one of said members and secured against longitudinal movement in one direction by its respective flange, said sleeve being provided with an enlarged portion adapted to be engaged by a wrench, and having a threaded forward portion, a locking ring threaded thereon said ring having a fixed, headed, bolt projecting forwardly therefrom, a movable headed bolt passing loosely through said sleeve, the flanges on the sleeve-bearing coupling member being suitably slotted to receive the loose bolt, and apertured to receive the fixed bolt, and the flange on the other coupling member being slotted to receive both said bolts, the latter flange being first engaged with the fixed bolt and the loose bolt being then dropped into the receiving slots in both flanges.

2. A pipe coupler comprising a pair of coupler members having contact faces non-rotatable relative to each other, a sleeve rotatably connected with one of said members and having screw threads on its outer face, a ring threadedly mounted on said sleeve, bolts fixedly secured to said ring, and bolts secured at one end to said ring but movable radially relative to said ring, said bolts adapted to be connected with said other member and all simultaneously movable with said ring whereby the said members are drawn to a liquid proof joint.

3. The combination with a coupling member adapted to be fixedly secured to the side of a vessel having a pair of fixed headed bolts projecting forwardly from the lower portion thereof and a pair of loose bolts projecting from the upper portion thereof, of a second coupling member comprising an abutting ring adapted to be secured to one end of a hose, and provided in its lower portion with a pair of vertical and parallel slots, whereby the ring with its attached hose may be readily hooked over and supported on the said fixed bolts, and having in its upper portion a pair of radial slots adapted to receive said loose bolts and means to move all of said bolts bodily simultaneously in the direction of their longitudinal axis.

In testimony whereof I affix my signature.

PERCY L. FARMER.